June 14, 1927.
P. HEYMER
1,632,290
INSTRUMENT FOR THE INSPECTION OF PIPES, CANALS, AND CAVITIES OF THE HUMAN OR ANIMAL BODY
Filed June 27, 1925
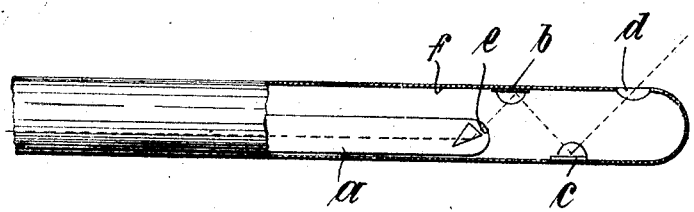
INVENTOR:
Paul Heymer Patented June 14, 1927.

1,632,290

UNITED STATES PATENT OFFICE.

PAUL HEYMER, OF BERLIN-REINICKENDORF-OST, GERMANY, ASSIGNOR TO HANS KOLLMORGEN, OF BERLIN-CHARLOTTENBURG, GERMANY.

INSTRUMENT FOR THE INSPECTION OF PIPES, CANALS, AND CAVITIES OF THE HUMAN OR ANIMAL BODY.

Application filed June 27, 1925, Serial No. 40,042, and in Germany July 1, 1924.

This invention relates to instruments for the inspection of ducts, passages, canals or cavities of the human or animal body.

Instruments for the inspection of cavities or hollows of the human or animal body, so-called cystoscopes and gastroscopes, have been in successful use for a long time. If, however, ducts, passages or canals of the body are to be inspected, numerous difficulties are experienced in the construction of such instruments by reason of the small distance between the instrument and the object to be inspected if a sufficiently large field of view is to be obtained.

If the interior of a duct or passage is viewed by means of an optical instrument without a broken or refracted optical axis, a larger part of the same will of course be surveyed, but under very unfavorable perspective conditions, so that observation is rendered difficult. If on the contrary an optical instrument having a refracted optical axis is employed, there is the disadvantage that only a small part of the interior wall face of the duct or passage can be viewed and that not at all distinctly in many cases. This is due to the fact that the distance of the object, namely of the mucous membrane of the duct or passage of the human body from the objective or lens of the instrument is very small. It has been tried to avoid these disadvantages by the employment of optical systems having an extremely large angle of view. The practice of dilating the bodily structure to obtain a larger distance of the object from the instrument has also been resorted to.

None of these methods however satisfies all requirements and the present invention has for its object to avoid the above mentioned drawbacks. With this object in view the invention consists in an instrument for the inspection of ducts, passages, canals and cavities of the human and animal body, comprising an outer tube having a side window and one or more reflectors situated between the said window and the image-forming part of the instrument, said reflectors being situated on the inner side of the outer tube and in such a manner that the distance between the side window and the front face of the first optical element of the inspecting tube is at least as large as the inner diameter of the outer tube. By this means the advantage is obtained that with a relatively small distance of the optical system from the reflector, the whole diameter of the outer tube can be used as object distance. Thus, by using as a base the normal diameter of the instrument, an apparent distance of a few millimetres in the case of cystoscopes and urethroscopes and a correspondingly larger distance in the case of larger instruments such as gastroscopes and the like will be obtained.

The invention is illustrated by way of example in the accompanying drawing which shows a part longitudinal elevation of the instrument partly in section.

Referring to the drawing, $f$ is the outer tube of the instrument into which is introduced the optical system $a$, the said outer tube being provided at one end with a window $d$ which may be a simple opening or may be covered with glass. In the path of the rays entering the tube $f$ through the window $d$ is situated a reflector $c$ situated at the inner wall face of the outer tube which lies opposite the window. In addition to the reflector $c$, a further reflector $b$ is interposed between the window $d$ and the front face of the first optical element $e$ of the inspecting tube $a$ in the path of the rays between the window $d$ and the inspecting tube. The distance between the side window $d$ and the front face of the first optical element $e$ of the inspecting tube $a$ is at least as large as the inner diameter of the outer tube $f$.

As illuminating means an electric incandescent lamp may be employed situated at the entrance to the optical system $a$.

The surface of the reflectors, any number of which may be provided, may be flat or curved. In the preferred constructional example shown in the drawing the reflectors have spherical surfaces.

The action of the arrangement above described will be evident from the drawing without any further explanation, the reflectors $b$, $c$ being arranged alternately at points of the inner wall of the outer tube $f$ lying opposite one another, the rays entering the window $d$ will be reflected from the reflector $c$ on to the reflector $b$ from which in turn they will be projected on to the first optical element $e$ of the inspecting tube $a''$.

The new instrument also is advantageous in the illumination and inspection of gun barrels and the like.

What I claim is:—

1. Instrument for the inspection of pipes, canals and cavities of the human or animal body comprising an outer tube provided with a lateral window, an inner picture-forming optical system and a reflector located between the window and the distal end of the optical system so as to allow the distance between them to be made at least equal to the tube's diameter.

2. Instrument for the inspection of pipes, canals and cavities of the human or animal body, comprising an outer tube provided with a lateral window, an inner picture-forming optical system and a reflector, located between the window and the end of the optical system so as to allow the distance between them to be made at least equal to the tube's diameter, and situated at the inner wall face of the outer tube which lies opposite to the side opening.

3. Instrument for the inspection of pipes, canals and cavities of the human or animal body, comprising an outer tube provided with a lateral window, an inner picture-forming optical system, a reflector located between the window and the end of the optical system so as to allow the distance between them to be made at least equal to the tube's diameter, and situated at the inner wall face of the outer tube which lies opposite to the side opening, and one or more further reflectors inserted into the ray passage between the side opening and the picture forming optical system.

4. Instrument for the inspection of pipes, canals and cavities of the human or animal body, comprising an outer tube provided with a lateral window, an inner picture-forming optical system a reflector located between the window and the end of the optical system so as to allow the distance between them to be made at least equal to the tube's diameter and situated at the inner wall face of the outer tube which lies opposite to the side opening, and one or more further reflectors inserted into the ray passage between the side opening and the picture-forming optical system and arranged alternately on points of the inner wall face of the outer tube lying opposite each other.

In testimony whereof I affix my signature.

PAUL HEYMER.